United States Patent
Misawa (10) Patent No.: US 7,218,348 B2
(45) Date of Patent: May 15, 2007

(54) SOLID-STATE ELECTRONIC IMAGING DEVICE AND METHOD OF CONTROLLING OPERTION THEREOF

(75) Inventor: Takeshi Misawa, Asaka (JP)

(73) Assignee: Fujifilm Corporation, Kanagawa (JP)

( * ) Notice: Subject to any disclaimer, the term of this patent is extended or adjusted under 35 U.S.C. 154(b) by 542 days.

(21) Appl. No.: 09/866,687

(22) Filed: May 30, 2001

(65) Prior Publication Data

US 2001/0048477 A1 Dec. 6, 2001

(30) Foreign Application Priority Data

Jun. 2, 2000 (JP) .............................. 2000-165271

(51) Int. Cl.
*H04N 5/335* (2006.01)
(52) U.S. Cl. ........................ 348/275; 348/272; 348/273
(58) Field of Classification Search ................ 348/272, 348/273, 274, 277, 279, 280, 275, 283; 382/167, 382/260; 358/517, 515, 513, 512, 514, 483, 358/482; 257/440
See application file for complete search history.

(56) References Cited

U.S. PATENT DOCUMENTS 5,485,204 A * 1/1996 Taniji ........................ 348/264
6,426,493 B1 * 7/2002 Oda ........................ 250/208.1
6,522,356 B1 * 2/2003 Watanabe .................... 348/272
6,795,119 B1 * 9/2004 Oda et al. .................... 348/273
6,882,364 B1 * 4/2005 Inuiya et al. ................ 348/252

FOREIGN PATENT DOCUMENTS

| JP | 11275594 A | * | 10/1999 |
| JP | 2000152259 A | * | 5/2000 |
| JP | 2000196965 A | * | 7/2000 |

* cited by examiner

*Primary Examiner*—Lin Ye
(74) *Attorney, Agent, or Firm*—Birch, Stewart, Kolasch & Birch, LLP (57) ABSTRACT

An object is to prevent a false signal from being generated. In a CCD comprising a lot of photodiodes, vertical transfer paths, and a horizontal transfer path, signal charges respectively representing R, G and B color components are mixed in the horizontal transfer path. Therefore, readout of the signal charges inputted to the horizontal transfer path from the photodiodes is controlled such that the order of the color components respectively represented by the signal charges is a repetition of R, G, B and G and a repetition of B, G, R and G in every other row. When complementary colors are generated by mixing pixels in the horizontal transfer path, they differ even in the same column, thereby making it possible to prevent a false signal from being generated.

8 Claims, 12 Drawing Sheets

| ODD ROW | G | R | G | B | G | R | G | B | G | R | G | B |
|---|---|---|---|---|---|---|---|---|---|---|---|---|

| Ye | W | Cy | W |
|---|---|---|---|

| EVEN ROW | G | B | G | R | G | B | G | R | G | B | G | R |
|---|---|---|---|---|---|---|---|---|---|---|---|---|

| Cy | W | Ye | W |
|---|---|---|---|

| ODD ROW | G | R | G | B | G | R | G | B | G | R | G | B |
|---|---|---|---|---|---|---|---|---|---|---|---|---|

| Ye | W | Cy | W |
|---|---|---|---|

Fig. 12

| | | | | |
|---|---|---|---|---|
| ODD ROW | Ye | W | Cy | W |
| EVEN ROW | Cy | W | Ye | W |
| ODD ROW | Ye | W | Cy | W |

Fig. 14

SOLID-STATE ELECTRONIC IMAGING DEVICE AND METHOD OF CONTROLLING OPERTION THEREOF

BACKGROUND OF THE INVENTION

1. Field of the Invention

The present invention relates to a solid-state electronic image imaging device comprising a lot of photoelectric conversion elements arranged in the column direction and the row direction, vertical transfer paths for transferring signal charges respectively accumulated in the photoelectric conversion elements in the vertical direction, transfer gates for respectively shifting the signal charges accumulated in the photoelectric conversion elements to the vertical transfer paths upon receipt of transfer gate pulses, and a horizontal transfer path for horizontally transferring the signal charges transferred from the vertical transfer paths and a method of controlling the operation thereof.

2. Background of the Invention

A CCD (Charge Coupled Device) in a honeycomb arrangement where photoelectric conversion elements are arranged in odd rows or even rows with respect to odd columns and arranged in even rows or odd rows with respect to even columns has been developed. In the CCD of the honeycomb arrangement, color filters which allow the transmission of a blue or red light component are respectively arranged on the photoelectric conversion elements in odd rows or even rows, and color filters which allow the transmission of a blue or red light component are alternately arranged for each column and for each row on the photoelectric conversion elements in even rows or odd rows.

In the CCD of the honeycomb arrangement, when signal charges are respectively shifted from the photoelectric conversion elements to the vertical transfer paths and are thinned such that the amount of signal charges is reduced to half, the signal charges outputted from the vertical transfer paths may, in some cases, be the same as signal charges obtained in a case where the same color filters are arranged on the photoelectric conversion elements of one column, for example, those in a solid-state electronic imaging device where color filters which allow the transmission of an R (red), G (green) or B (blue) light component are arranged on the photoelectric conversion elements of one column for each column. In such a case, when signal charges corresponding to three pixels which are adjacent in the horizontal direction are mixed to generate complementary colors, all of the columns are white (W), yellow (Ye) or cyan (Cy) (the reason why the complementary colors are generated is that the number of pixels corresponding to the signal charges is substantially reduced to one-third by generating the complementary colors, thereby making it possible to increase the speed of transfer).

In order to return (or reproduce) signals representing the generated complementary colors to an RGB color signal, signals representing three complementary colors, i.e., white, yellow and cyan are required. Unless signal charges corresponding to four pixels are used in the horizontal direction, the three complementary colors, i.e., white, yellow and cyan cannot be obtained. Even if signal processing is devised, therefore, false signals are increased.

Such a problem also arises with a so-called G-stripe B/R checkered color filter arrangement where color filters which allow the transmission of a green light component are arranged in a vertical stripe shape, and color filters which allow the transmission of a blue or red light component are arranged in a checkered shape.

SUMMARY OF THE INVENTION

An object of the present invention is to prevent a false signal from being generated.

A solid-state electronic imaging device according to the present invention is characterized by comprising a lot of photoelectric conversion elements arranged in the column direction and the row direction; vertical transfer paths for transferring signal charges respectively accumulated in the photoelectric conversion elements in the vertical direction; transfer gates for respectively shifting the signal charges accumulated in the photoelectric conversion elements to the vertical transfer paths upon receipt of transfer gate pulses; a horizontal transfer path for horizontally transferring the signal charges transferred from the vertical transfer paths; color filters respectively formed on the photoelectric conversion elements such that the order of color signal components respectively represented by the signal charges substantially corresponding to one row which are inputted to the horizontal transfer path in reading out all pixels is a repetition of a red signal component, a green signal component, a blue signal component, and a green signal component, and the respective timings at which the red signal component and the blue signal component are outputted in odd rows are reverse to those in even rows; and readout control means for applying the transfer gate pulses to the transfer gates such that the order of color signal components respectively represented by the signal charges substantially corresponding to one row which are inputted to the horizontal transfer path is a repetition of a red signal component, a green signal component, a blue signal component, and a green signal component in every other row, and the respective timings at which the red signal component and the blue signal component are outputted in odd rows are reverse to those in even rows.

The present invention also provides an operation controlling method suitable for the above-mentioned device. That is, in a solid-state electronic imaging device comprising a lot of photoelectric conversion elements arranged in the column direction and the row direction, vertical transfer paths for transferring signal charges respectively accumulated in the photoelectric conversion elements in the vertical direction, transfer gates for respectively shifting the signal charges accumulated in the photoelectric conversion elements to the vertical transfer paths upon receipt of transfer gate pulses, and a horizontal transfer path for horizontally transferring the signal charges transferred from the horizontal transfer paths, the method is characterized in that color filters are respectively formed on the photoelectric conversion elements and arranged such that the order of color signal components respectively represented by the signal charges substantially corresponding to one row which are inputted to the horizontal transfer path in reading out all pixels is a repetition of a red signal component, a green signal component, a blue signal component, and a green signal component, and the respective timings at which the red signal component and the blue signal component are outputted in odd rows are reverse to those in even rows, and the transfer gate pulses are applied to the transfer gates such that the order of color signal components respectively represented by the signal charges substantially corresponding to one row which are inputted to the horizontal transfer path is a repetition of a red signal component, a green signal component, a blue signal component, and a green signal component in every other row, and the respective timings at which the red signal component and the blue signal component are outputted in odd rows are reverse to those in even rows.

According to the present invention, the transfer gate pulses are applied to the transfer gates such that the color signal components respectively represented by the signal charges substantially corresponding to one row which are inputted to the horizontal transfer path are repeated every other row in the order of the red signal component, the green signal component, the blue signal component, and the green signal component, and the respective timings at which the red signal component and the blue signal component are outputted in odd rows are reverse to those in even rows.

According to the present invention, the color signal components respectively represented by the signal charges substantially corresponding to one row which are inputted to the horizontal transfer path are the red signal component, the green signal component, the blue signal component, and the green signal component in every other row, and the respective timings at which the red signal component and the blue signal component are outputted in odd rows are reverse to those in even rows. Even if signal charges respectively representing complementary colors are generated from the signal charges respectively representing the red signal component, the green signal component, and the blue signal component, different complementary colors appear in every other row even in the same column. Therefore, the complementary colors can be prevented from being the same for each column, thereby making it possible to prevent a false signal from being generated.

The photoelectric conversion elements are in a honeycomb arrangement, for example, where they are arranged in odd rows or even rows with respect to odd columns and arranged in even rows or odd rows with respect to even columns. In this case, the color filters which allow the transmission of a green light component are respectively arranged in the photoelectric conversion elements in odd rows or even rows, and the color filters which allow the transmission of a blue or red light component are alternately arranged for each column and for each row in the photoelectric conversion elements in even rows or odd rows.

The color filters may be in G-stripe R/B checkered color filter arrangement where the color filters which allow the transmission of a green light component are arranged in a vertical stripe shape, and the color filters which allow the transmission of a blue or red light component are arranged in a checkered shape.

The foregoing and other objects, features, aspects and advantages of the present invention will become more apparent from the following detailed description of the present invention when considered in conjunction with the accompanying drawings.

DESCRIPTION OF THE PREFERRED EMBODIMENTS

Figure 1:
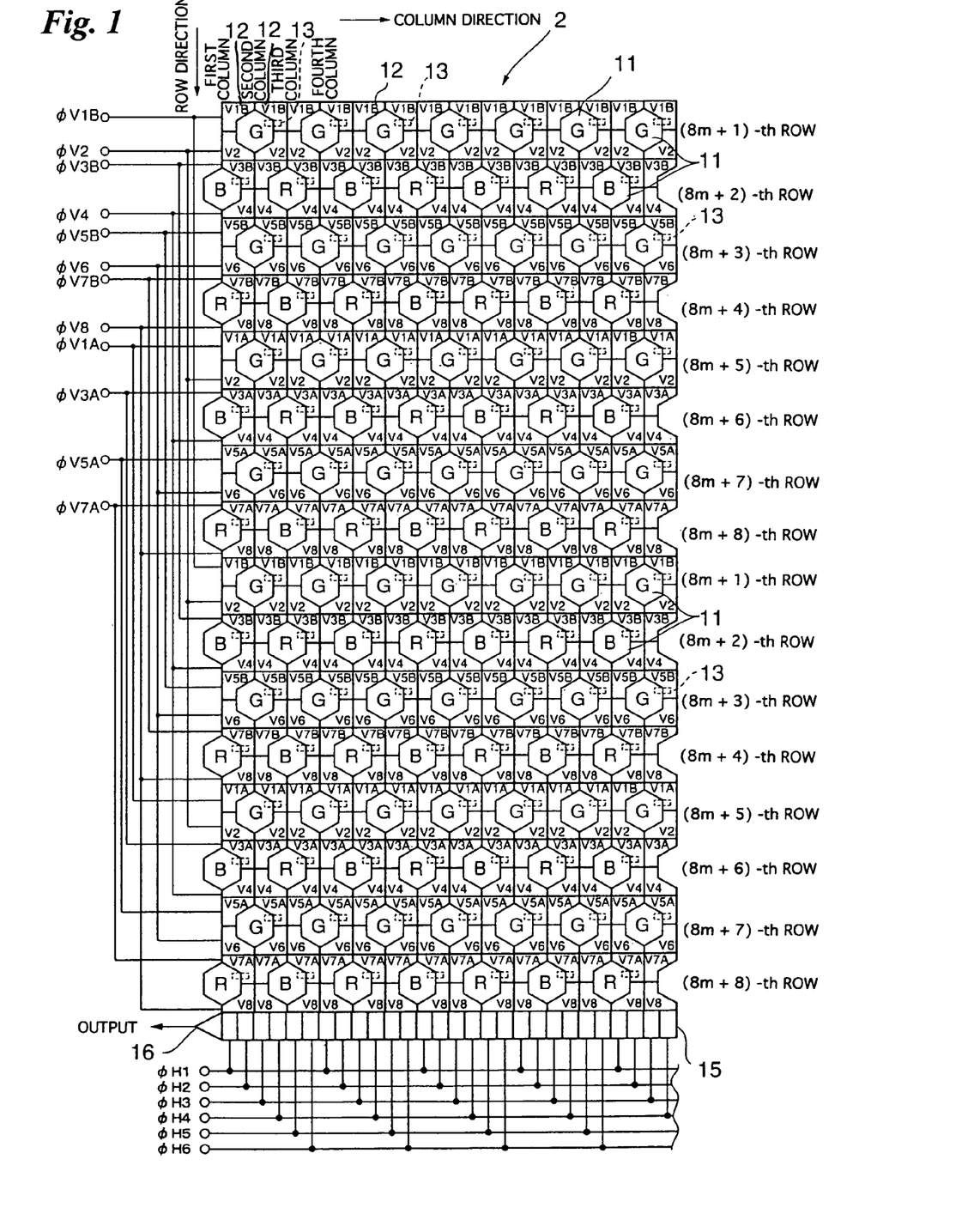
FIG. 1 illustrates a part of a light receiving surface of a CCD in a honeycomb arrangement.

FIG. 1 illustrates a part of a structure of a light receiving surface of a CCD.

A lot of photodiodes 11 are arranged on the CCD 2 over a plurality of columns and a plurality of rows. The photodiodes 11 are arranged in even rows with respect to odd columns and arranged in odd rows with respect to even columns. They may be arranged in odd rows with respect to odd columns and arranged in even rows with respect to even columns. An R color filter having the property of transmitting a red light component, a B color filter having the property of transmitting a blue light component, or a G color filter having the property of transmitting a green light component is formed on a light receiving region of the photodiode 11. A letter "R" is assigned to the photodiode 11 having the R color filter formed thereon, a letter "B" is assigned to the photodiode 11 having the B color filter formed thereon, and a letter "G" is assigned to the photodiode 11 having the G color filter formed thereon. The light receiving region of the photodiode 11 is in a hexagonal shape as viewed from the top.

A vertical transfer path 12 is formed on the right side (or on the left side) of the photodiodes 11 in each of the columns. Vertical transfer electrodes V1B and V2 are provided on the right side of the photodiode 11 in the (8m+1)-th row. Vertical transfer electrodes V3B and V4 are provided on the right side of the photodiode 11 in the (8m+2)-th row. Vertical transfer electrodes V5B and V6 are provided on the right side of the photodiode 11 in the (8m+3)-th row. Vertical transfer electrodes V7B and V8 are provided on the right side of the photodiode 11 in the (8m+4)-th row. Vertical transfer electrodes V1A and V2 are provided on the right side of the photodiode 11 in the (8m+5)-th row. Vertical transfer electrodes V3A and V4 are provided on the right side of the photodiode 11 in the (8m+6)-th row. Vertical transfer electrodes V5A and V6 are provided on the right side of the photodiode 11 in the (8m+7)-th row. Vertical transfer electrodes V7A and V8 are provided on the right side of the photodiode 11 in the (8m+8)-th row.

The vertical transfer electrodes in eight rows from the (8m+1)-th row to the (8m+8)-th row constitute one set. The set is repeated, to form the vertical transfer electrodes on the vertical transfer path 12. From the vertical transfer electrodes V1A to V8, corresponding vertical transfer pulses φV1A to φV8 are respectively fed. Consequently, the signal charges respectively accumulated in the photodiodes 11 are transferred in the row direction (in the vertical direction) along the vertical transfer path 12.

A transfer gate 13 for shifting the signal charge accumulated in the photodiode 11 to the vertical transfer path 12 is formed between the photodiode 11 and the vertical transfer path 12. When a transfer gate pulse is fed to the transfer gate 13, the signal charge accumulated in the photodiode 11 is shifted to the vertical transfer path 12.

The CCD 2 is further provided at lowermost portion thereof (in FIG. 1) with a horizontal transfer path 15 for transferring the signal charges in the column direction (the horizontal direction) in response to the fed horizontal transfer pulses φH1 to φH6. When the signal charges transferred in the vertical transfer paths 12 are fed to the horizontal transfer path 15, the signal charges are transferred in the horizontal direction, and are outputted to the exterior through an amplification circuit 16.

Figure 2A:
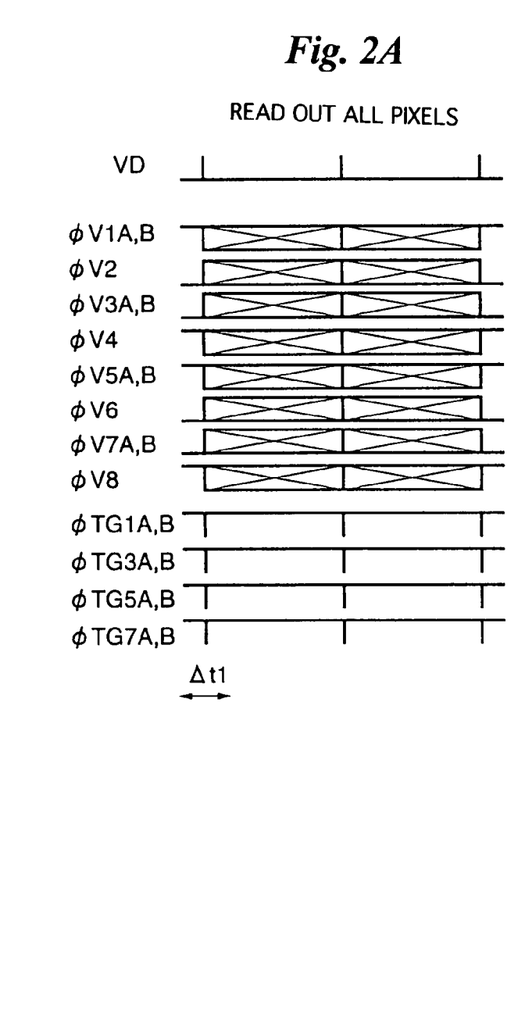
FIGS. 2A, 2B, and 2C are timing charts showing readout of all pixels in a CCD in a honeycomb arrangement.
Figure 2B:
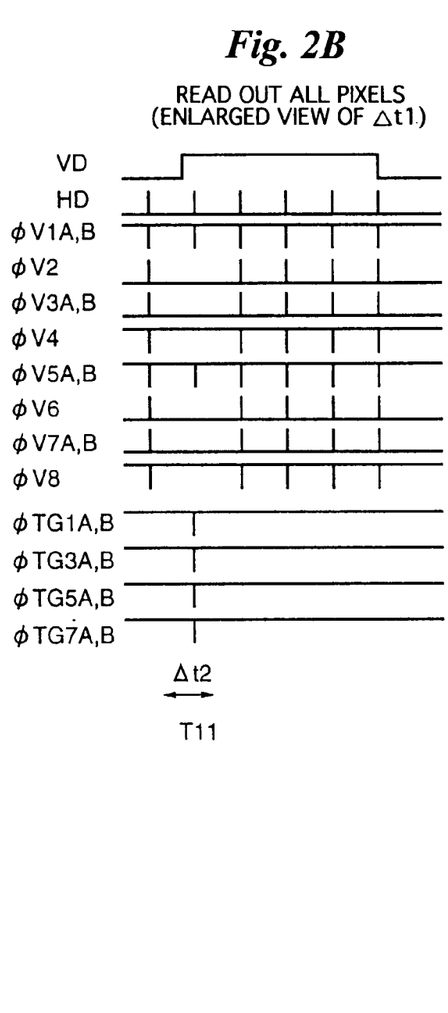
Figure 2C:
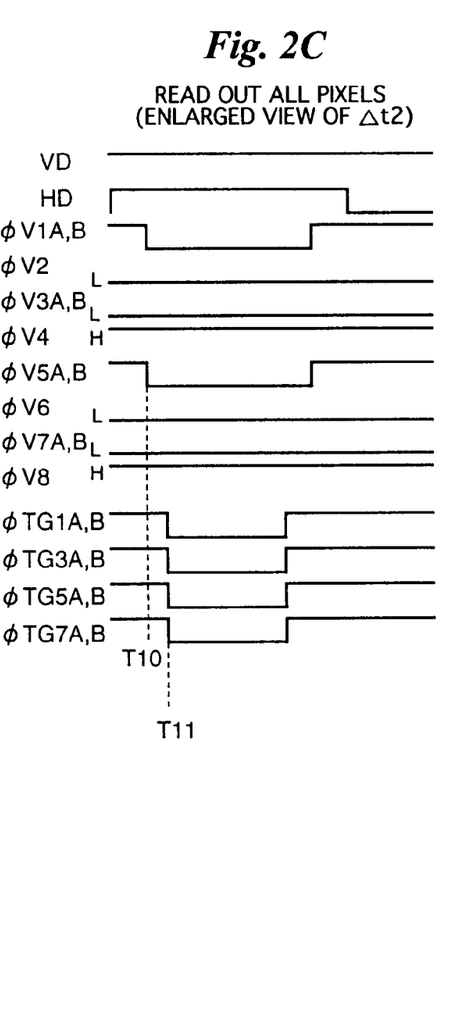

FIGS. 2A, 2B, and 2C are timing charts in a case where signal charges respectively accumulated in all the photodiodes 11 in the CCD 2 shown in FIG. 1 are read out (all pixels are read out), where the signal charges accumulated in the photodiodes 11 are shifted to the vertical transfer paths 12. FIG. 2B illustrates a time period Δt1 shown in FIG. 2A in enlarged fashion, and FIG. 2C illustrates a time period Δt2 shown in FIG. 2B in enlarged fashion.

At the time T10, vertical transfer pulses φV1A, φV1B, and φV5A, φV5B at an L level are respectively fed to the vertical transfer electrodes V1A, V1B, and V5A, V5B. Consequently, potential wells for accumulating the signal charges are respectively formed under the vertical transfer electrodes V1A, V1B, and V5A, V5B. Vertical transfer pulses φV3A, φV3B, and φV7A, φV7B at an L level are respectively fed to the vertical transfer electrodes V3A, V3B, and V7A, V7B. Consequently, quantum wells are respectively formed under the vertical transfer electrodes V3A, V3B, and V7A, V7B. Vertical transfer pulses φV4 and φV8 at an H level are respectively fed to the vertical transfer electrodes V4 and V8. Consequently, potential barriers are respectively formed under the vertical transfer electrodes V4 and V8, thereby preventing the signal charges between the different pixels from being mixed.

At the time T11, readout pulses φTG1A, φTG1B, φTG3A, φTG3B, φTG5A, φTG5B, φTG7A and φTG7B are fed to all the transfer gates 13. Consequently, the signal charges accumulated in all the photodiodes 11 are shifted to the vertical transfer paths 12.

Figure 3:
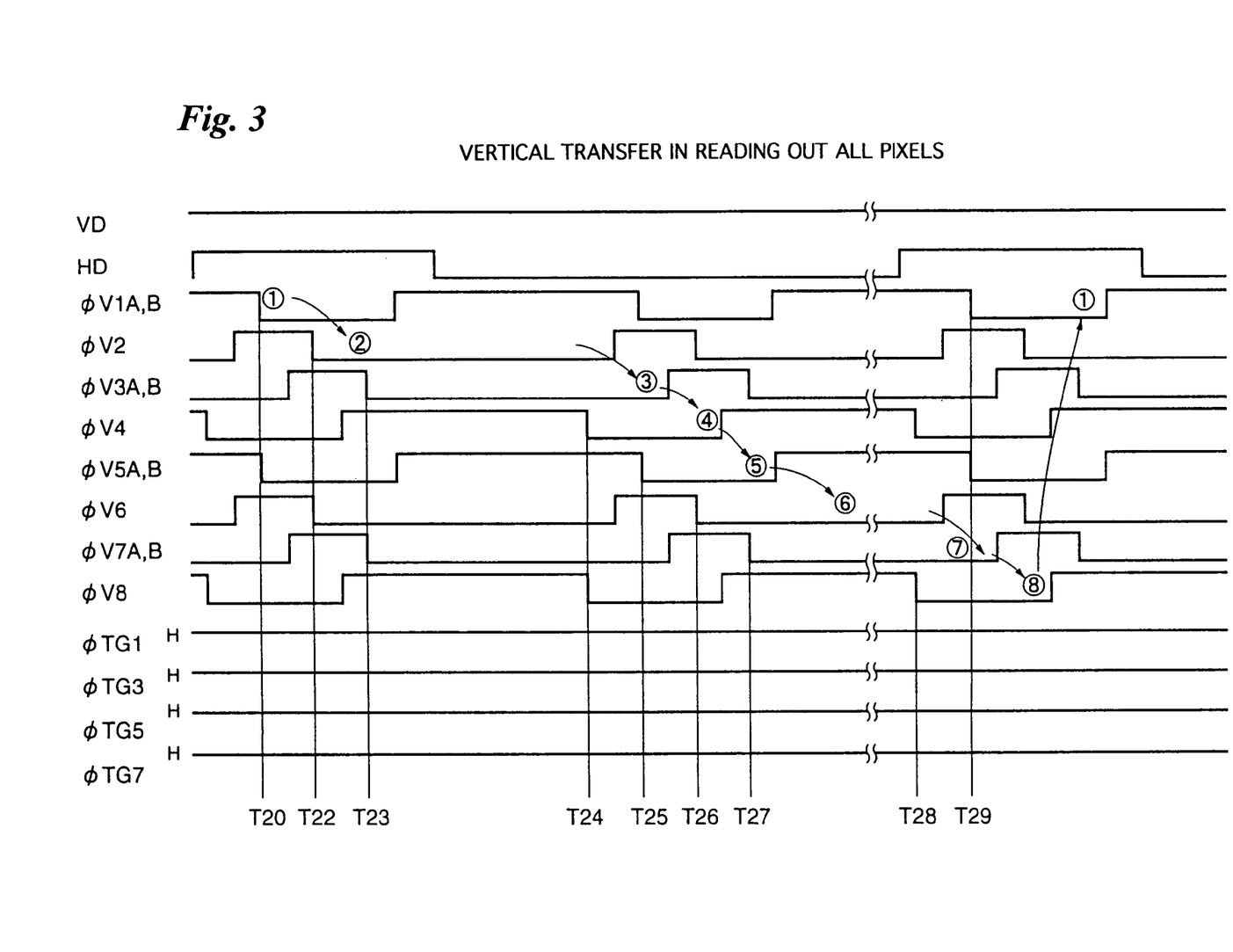
FIG. 3 is a timing chart showing vertical transfer of signal charges.

FIG. 3 is a timing chart in a case where the signal charges are transferred in the vertical transfer path 12 in reading out all pixels.

At the time T20, the vertical transfer pulses φV1A and φV1B are respectively fed to the vertical transfer electrodes V1A and V1B, so that the signal charges are stored under the vertical transfer electrodes V1A and V1B. At the time T22 in a time period during which the vertical transfer pulses φV1A and φV1B are at an L level, the vertical transfer pulse φV2 which becomes an L level is fed to the vertical transfer electrode V2. The signal charge under the vertical transfer electrodes V1A, V1B is transferred to the portion under the vertical transfer electrode V2. Thereafter, at the time T23 in a time period during which the vertical transfer pulse φV2 is at an L level, the vertical transfer pulses φV3A, φV3B which changes to an L level is fed to the vertical transfer electrode V3A, V3B. Consequently, the signal charge under the vertical transfer electrode V2 is transferred to the portion under the vertical transfer electrodes V3A, V3B.

In the same manner, the signal charge is transferred to the portion under the vertical transfer electrode V4 at the time T24. Further, the signal charge is transferred to the portion under the vertical transfer electrodes V5A, V5B at the time T25, the signal charge is transferred to the portion under the vertical transfer electrode V6 at the time T26, the signal charge is transferred to the portion under the vertical transfer electrodes V7A, V7B at the time T27, and the signal charge is transferred to the portion under the vertical transfer electrode V8 at the time T28. At the time T29, the signal charge is transferred to the portion under the vertical transfer electrodes V1A, V1B.

The signal charges are thus vertically transferred toward the horizontal transfer path 15 in the vertical transfer paths 12. The signal charges respectively stored in the photodiodes 11 corresponding to two rows are mixed in the horizontal transfer path 15 and are substantially considered as (become) signal charges corresponding to one row which repeat in the order of R, G, B and G. In this case, the order of color components respectively represented by the signal charges is a repetition of R, G, B and G.

Although the above-mentioned transfer is related to the signal charges respectively shifted to the portion under the vertical transfer electrodes V1A, V1B from the photodiodes 11, it goes without saying that the other signal charges are vertically transferred in the vertical transfer path 12 in the same manner.

When all pixels are read out, the signal charges corresponding to the first two rows (8m+7)-th row and (8m+8)-th row) which are inputted to the horizontal transfer path 15 are substantially considered as (become) signal charges corresponding to one row and are inputted to the horizontal transfer path 15. In this case, the order of color components respectively represented by the signal charges is a repetition of R, G, B and G. However, the order of color components respectively represented by signal charges substantially corresponding to one row which are then inputted to the horizontal transfer path 15 is not a repetition of R, G, B and G but a repetition of B, G, R and G. The red component and the blue component out of the color components respectively represented by signal charges substantially corresponding to one row which are inputted to the horizontal transfer path 15 are reverse to each other for each row substantially considered. When the signal charges are mixed to generate complementary color signals every three pixels, therefore, the order of the complementary color signals changes for each row. Even when an RGB color signal is generated from signals representing the complementary colors, therefore, a false signal is prevented from being generated.

When the signal charges respectively accumulated in the photodiodes 11 in every two rows are read out in order to perform ½ pixel thinning, however, the order of the color components respectively represented by the signal charges substantially corresponding to one row which are inputted to the horizontal transfer path 15 through the vertical transfer paths 12 is always a repetition of R, G, B and G. When the signal charges are mixed every three pixels to generate the complementary color signals, therefore, the order of the complementary color signal will be the same in all rows. When the RGB color signal is generated from the complementary color signals, a false color is generated.

FIGS. 4 to 6A, 6B, and 6C are diagrams for explaining the operation of the CCD for preventing a false color from being generated even if pixel thinning is performed.

Figure 4:
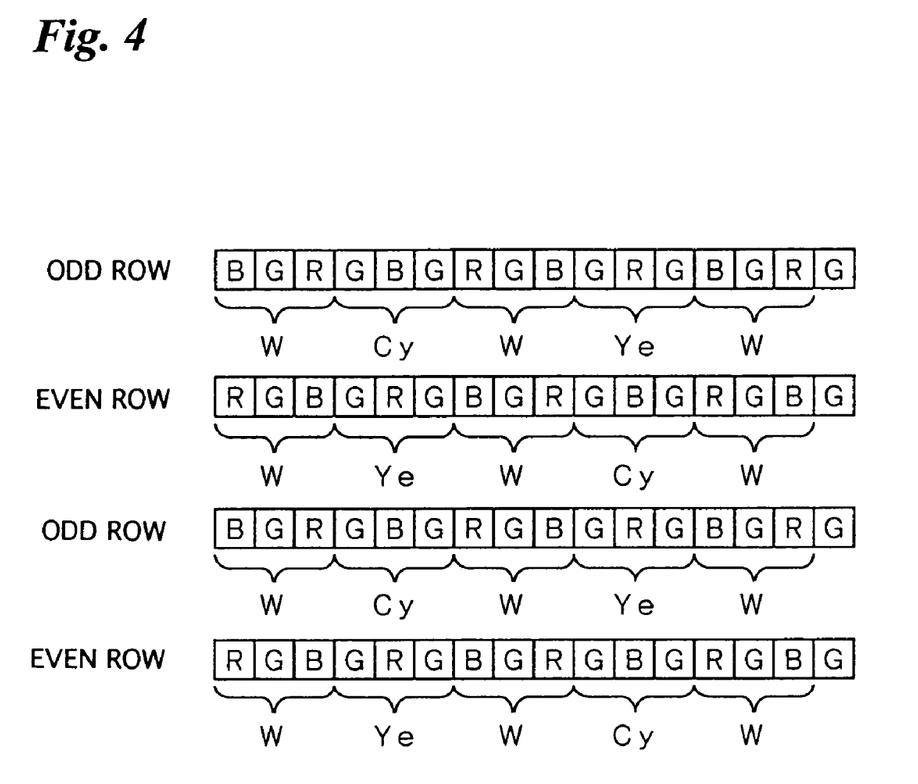
FIG. 4 illustrates color light components respectively represented by signal charges inputted to a horizontal transfer path.

FIG. 4 illustrates R, G, or B light components represented by the signal charges inputted from the vertical transfer paths 12 to the horizontal transfer path 15 for each substantial row as odd rows and even rows.

In the present embodiment, the CCD 2 is driven such that even if pixel thinning (½ pixel thinning) is performed, the order of the color components respectively represented by the signal charges inputted to the horizontal transfer path 15 is alternately a repetition of R, G, B and G and a repetition of B, G, R and G for each row substantially considered. When the signal charges corresponding to three pixels respectively representing the color components R, G and B are mixed to generate the complementary color signals, the order of the complementary colors can be prevented from being the same in all rows, thereby making it possible to prevent a false signal from being generated.

Figure 5:
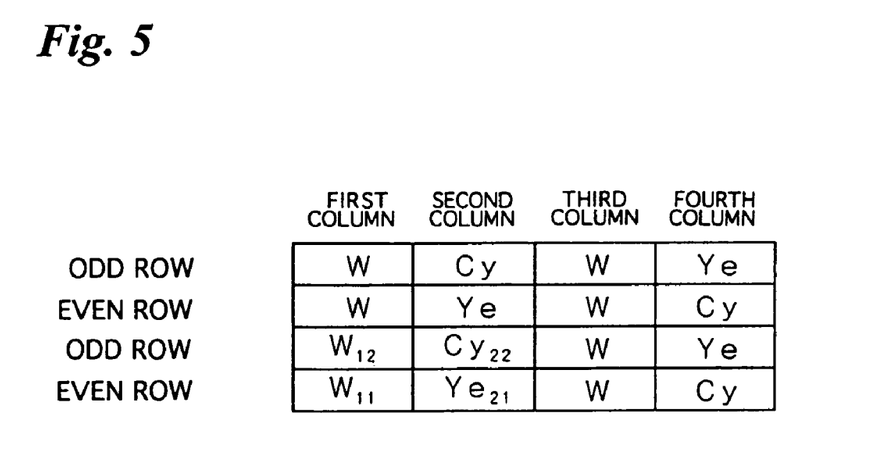
FIG. 5 illustrates complementary colors generated as a result of mixing of pixels in a horizontal transfer path.

As shown in FIG. 5, the complementary colors in the second column are cyan (Cy) in odd rows, while being yellow (Ye) in even rows, for example. The complementary colors in the first column are white (W). As a result, it is possible to generate an RGB color signal from the complementary colors using the signal charges corresponding to two pixels adjacent along columns corresponding to at least two rows.

The generation of the RGB color signal using the signal charges corresponding to two pixels adjacent along columns corresponding to two rows can be realized in accordance with the following equations 1 to 3 when three pixels are used.

$$R_{11}=(2W_{11}+Ye_{21}-2Cy_{22})/3 \quad \text{Eq. 1}$$

$$G_{11}=(Ye_{21}+Cy_{22}-W_{11})/3 \quad \text{Eq. 2}$$

$$B_{11}=(2W_{11}+Cy_{22}-Ye_{21})/3 \quad \text{Eq. 3}$$

The generation of the RGB color signal using the signal charges corresponding to two pixels adjacent along columns corresponding to two rows can be realized in accordance with the following equations 4 to 6 when four pixels are used.

$$R_{11}=(W_{11}+W_{12}Ye_{21}-2Cy_{22})/3 \quad \text{Eq. 4}$$

$$G_{11}=(2Ye_{21}+2Cy_{22}-W_{11}-W_{12})/6 \quad \text{Eq. 5}$$

$$B_{11}=(W_{11}+W_{12}+Cy_{22}-Ye_{21})/3 \quad \text{Eq. 6}$$

Figure 6A:
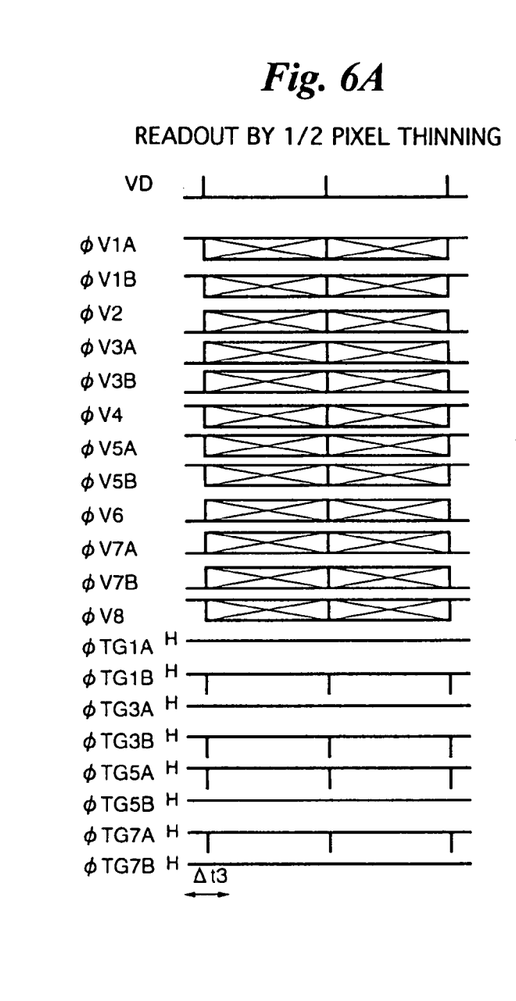
FIGS. 6A, 6B, and 6C are timing charts showing readout by ½ pixel thinning in a CCD in a honeycomb arrangement.
Figure 6B:
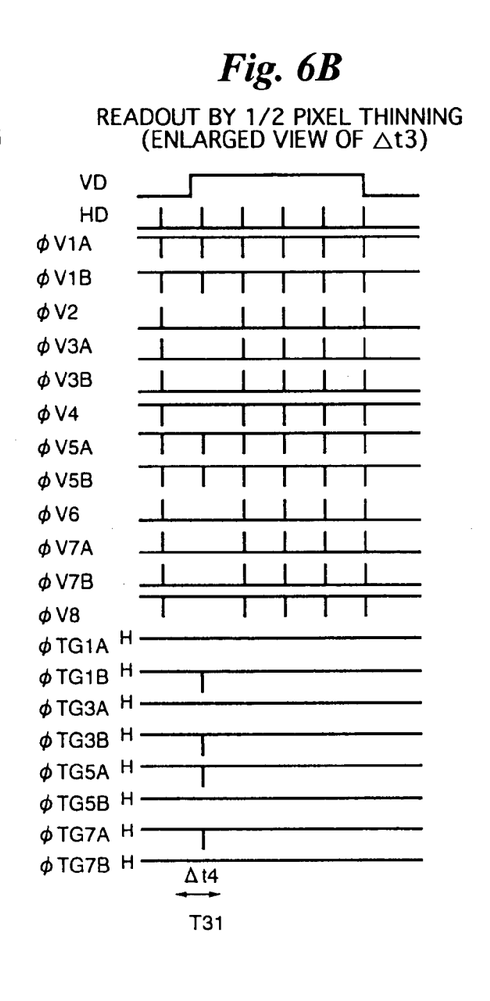
Figure 6C:
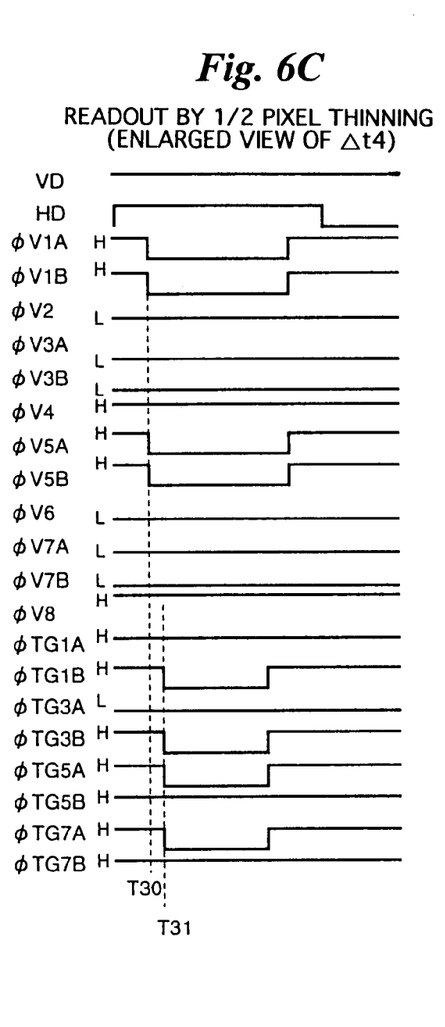

FIGS. 6A, 6B, and 6C are timing charts in a case where the signal charges respectively accumulated in the photodiodes 11 are shifted to the vertical transfer paths 12 by ½ pixel thinning. FIG. 6B is an enlarged view showing a time period Δt3 shown in FIG. 6A, and FIG. 6C is an enlarged view showing a time period Δt4 shown in FIG. 6B.

At the time T30, vertical transfer pulses respectively fed to the vertical transfer electrodes other than the vertical transfer electrodes V4 and V8 are at an L level. Consequently, potential wells are respectively formed under the vertical transfer electrodes other than the vertical transfer electrodes V4 and V8. Potential barriers are respectively formed under the vertical transfer electrodes V4 and V8.

At the time T31, transfer gate pulses φTG1B, φTG3B, φTG5A, and φTG7A are respectively fed to the transfer gates 13 corresponding to the vertical transfer electrodes V1B, V3B, V5A, and V7A. Consequently, the signal charges respectively accumulated in the photodiodes 11 in the (8m+1)-th row, the (8m+2)-th row, the (8m+7)-th row, and the (8m+8)-th row are shifted from the photodiodes 11 to the vertical transfer paths 12. The signal charges respectively accumulated in the other photodiodes 11 are not shifted from the photodiodes 11 to the vertical transfer paths 12. Accordingly, ½ pixel thinning is accomplished.

The signal charges shifted to the vertical transfer paths 12 are vertically transferred in the vertical transfer paths 12 and are inputted to the horizontal transfer path 15 in the same manner as in reading out all pixels.

The signal charges respectively accumulated in the photodiodes 11 in the (8m+1)-th row and the (8m+2)-th row are substantially considered as signal charges corresponding to one row, and are inputted to the horizontal transfer path 15. The signal charges respectively accumulated in the photodiodes 11 in the (8m+7)-th row and the (8m+8)-th row are substantially considered as signal charges corresponding to one row, and are inputted to the horizontal transfer path 15. The order of color signal components respectively represented by the signal charges accumulated in the photodiodes 11 in the (8m+1)-th row and the (8m+2)-th row which are substantially considered as signal charges corresponding to one row is a repetition of B G, R and G. Similarly, the order of color signal components respectively represented by the signal charges accumulated in the photodiodes in the (8m+7)-th row and the (8m+8)-th row which are substantially considered as signal charges corresponding to one row is a repetition of R, G, B and G.

As described in the foregoing, the RGB color components respectively represented by the signal charges substantially corresponding to one row which are inputted to the horizontal transfer path 15 differ in order for each row (see FIG. 4). Complementary colors generated even in the same column differ for each row, as described above, thereby making it possible to prevent a false signal from being generated.

Figure 7:
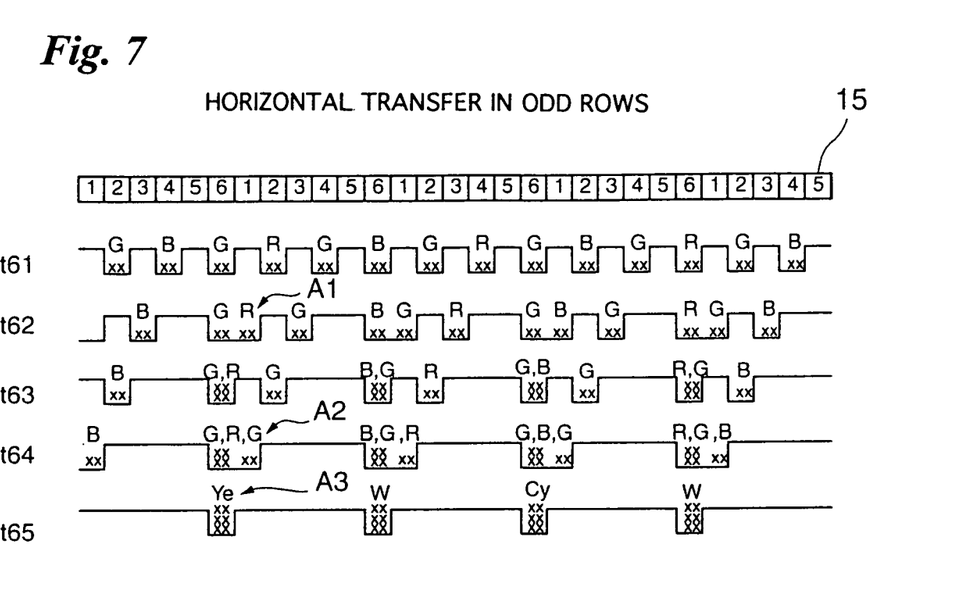
FIG. 7 is a timing chart showing transfer of signal charges in a horizontal transfer path.
Figure 8:
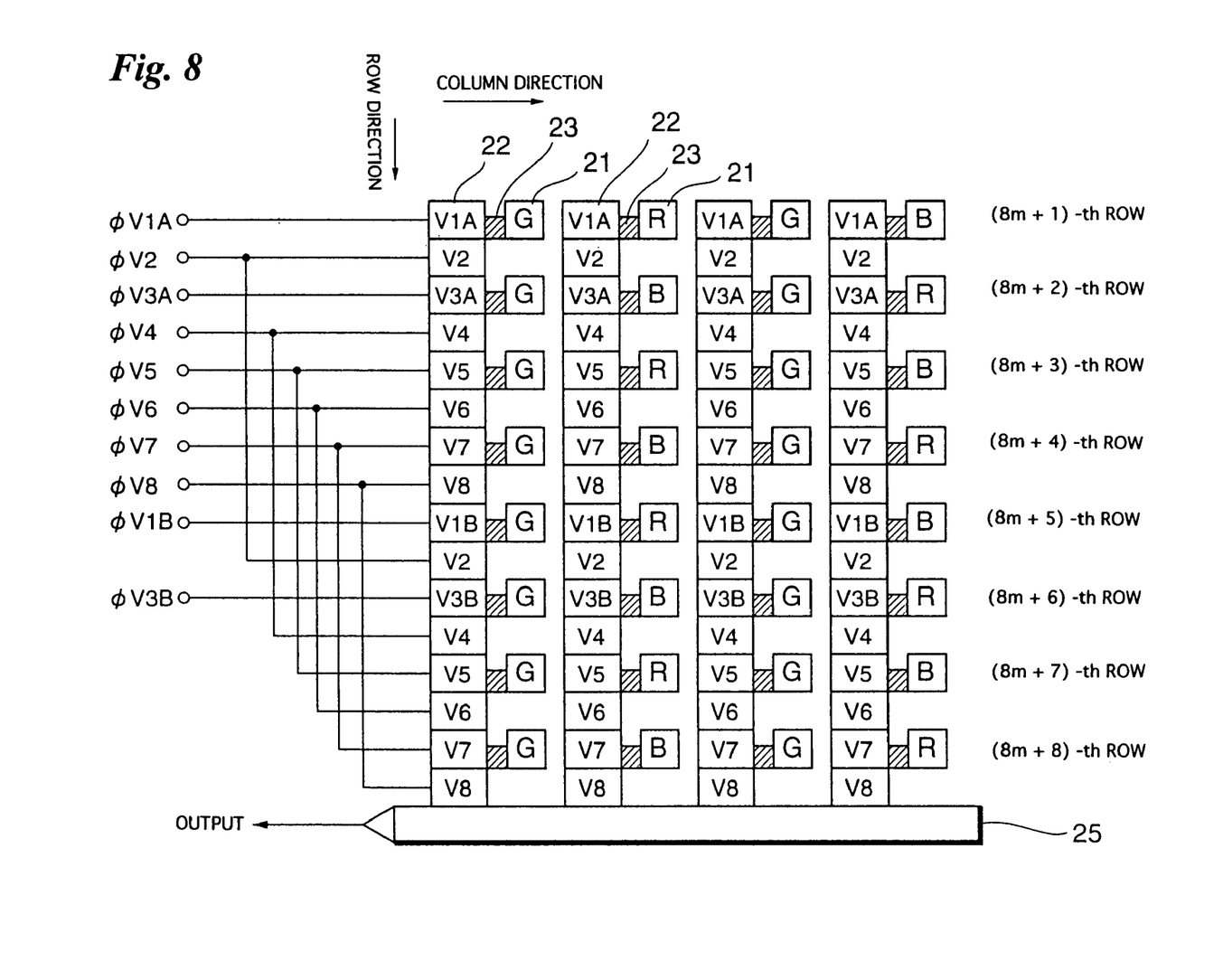
FIG. 8 illustrates a part of a light receiving surface of a CCD in a G-stripe R/B checkered arrangement.

FIGS. 7 and 8 are timing charts showing how pixels are mixed in the horizontal transfer path 15. FIG. 7 is a timing chart showing horizontal transfer in odd rows (rows substantially considered when inputted to the horizontal transfer path 15), and FIG. 8 is a timing chart showing horizontal transfer in even rows. In FIGS. 7 and 8, electrodes H1 to H6 in the horizontal transfer path 15 are indicated by numerical values.

At the time t61, horizontal transfer pulses φH2, φH4, and φH6 are respectively applied to the horizontal transfer electrodes H2, H4, and H6. Consequently, signal charges each representing a G, R, or B light component are shifted from the vertical transfer paths 12 to the horizontal transfer path portions under the horizontal transfer electrodes H2, H4, and H6. In this case, the order of the light components is R, G, B and G.

At the time t62, horizontal transfer pulses φH1, φH3, and φH6 are respectively applied to the horizontal transfer electrodes H1, H3, and H6. Consequently, two of the signal charges respectively representing an R light component, a G light component, and a B light component are mixed, and the other signal charge is transferred only by an amount (length or pitch) corresponding to one horizontal transfer electrode. For example, the signal charge representing the G light component and the signal charge representing the R light component are mixed, as indicated by a reference numeral A1 in FIG. 7.

At the time t63, horizontal transfer pulses φH2 and φH6 are respectively applied to the horizontal transfer electrodes H2 and H6. Consequently, the signal charges are transferred only by an amount (length or pitch) corresponding to one horizontal transfer electrode in the horizontal direction.

At the time t64, horizontal transfer pulses φH1 and φ H6 are respectively applied to the horizontal transfer electrodes H1 and H6. Consequently, the signal charges respectively representing three light components R, G, and B are mixed in any one of a combination of G, R and G, a combination of B, G and R, and a combination of G, B and G. For example, the signal charges respectively representing light components G, R and G are mixed, as indicated by a reference numeral A2 in FIG. 7.

At the time t65, a horizontal transfer pulse φH6 is applied to the horizontal transfer electrode H6.

Consequently, the mixed signal charges are stored under the one horizontal transfer electrode H6. The signal charges represent any one of complementary colors, i.e., white (W), yellow (Ye), and cyan (Cy) depending on a combination of light components R, G and B. The signal charges representing a combination of light components G, R and G are mixed, as indicated by reference numerals A2 and A3 shown in FIG. 7, so that the signal charges represent yellow. The signal charges representing a combination of light components R, G and B are mixed, so that the signal charges represent white. The signal charges representing a combination of light components G, B and G are mixed, so that the signal charges represent cyan.

The RGB color signal is converted into color signals in complementary colors, i.e, cyan, yellow and white by mixing pixels corresponding to the signal charges. Accordingly, the amount of the signal charges to be substantially transferred is reduced. The signal charges can be quickly transferred when they are horizontally transferred.

A case where the signal charges respectively accumulated in the photodiodes 11 in even rows are horizontally transferred is the same as a case where the signal charges respectively accumulated in the photodiodes 11 in odd rows are horizontally transferred.

Although in the above-mentioned embodiment, description was made of the CCD in the honeycomb arrangement, the present invention is also applicable to CCDs other than the CCD in the honeycomb arrangement.

FIGS. 8 to 12 are used in description for driving a CCD of an IT (interline transfer) type in order to prevent a false signal from being generated.

FIG. 8 illustrates a part of a light receiving surface of the interline transfer type CCD.

A lot of photodiodes 21 are arranged in the row direction and in the column direction. A vertical transfer path 22 is formed through transfer gates 23 on the left side of the photodiodes 21. Vertical transfer electrodes V1A, V2, V3A, V4, V5, V6, V7, V8, V1B, and V3B are periodically provided on the vertical transfer paths 22. Vertical transfer pulses φV1A, φV2, φV3A, φV4, φV5, φV6, φV7, φV8, φV1B and φV3B corresponding to the vertical transfer electrodes V1A, V2, V3A, V4, V5, V6, V7, V8, V1B, and V3B are applied.

Color filters (assigned a letter "G") which allow the transmission of a green light component are respectively formed on the photodiodes 21 in odd columns. On the photodiodes 21 in even columns, color filters (assigned a letter "R") which allow the transmission of a red light component and color filters (assigned a letter "B") which allow the transmission of a blue light component are alternately formed for each row such that they differ in the adjacent even columns.

Furthermore, a horizontal transfer path 25 is provided on the output side of the vertical transfer paths 22.

FIGS. 9A, 9B and 9C and FIGS. 10A and 10B are timing charts in a case where all pixels are read out in the interline transfer type CCD shown in FIG. 8.

Figure 9A:
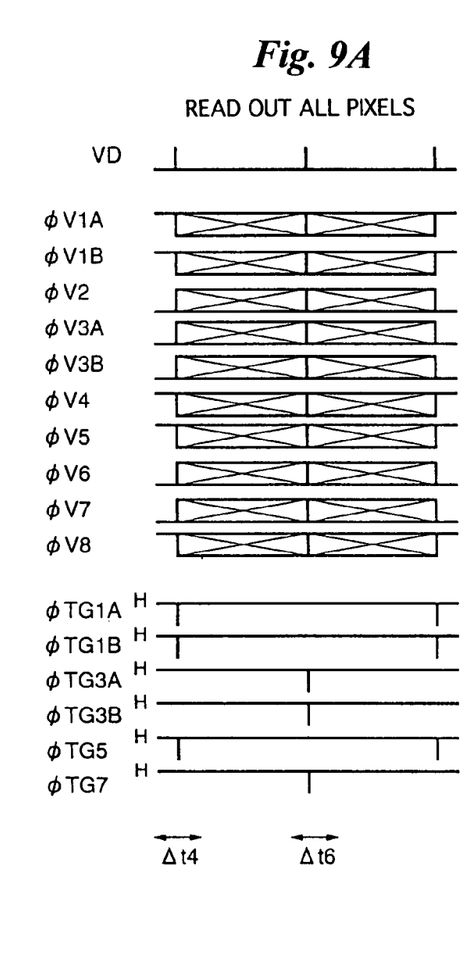
FIGS. 9A, 9B, and 9C are timing charts showing readout of all pixels in a CCD in a G-stripe R/B checkered arrangement.
Figure 9B:
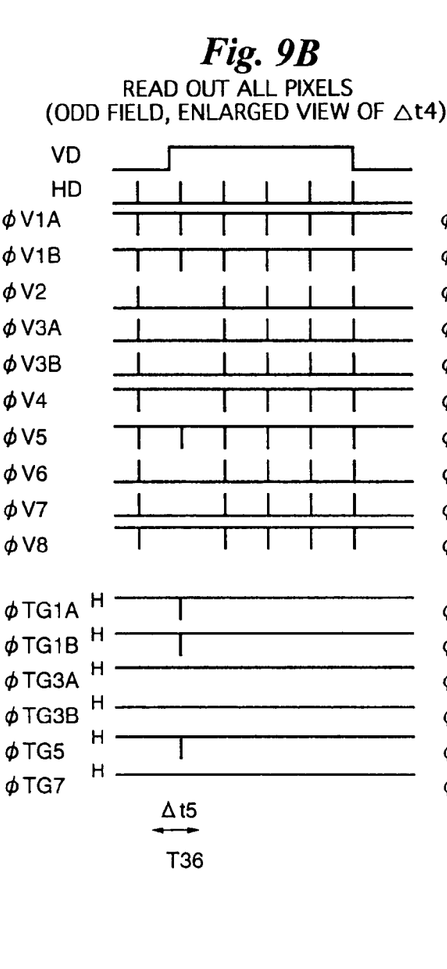
Figure 9C:
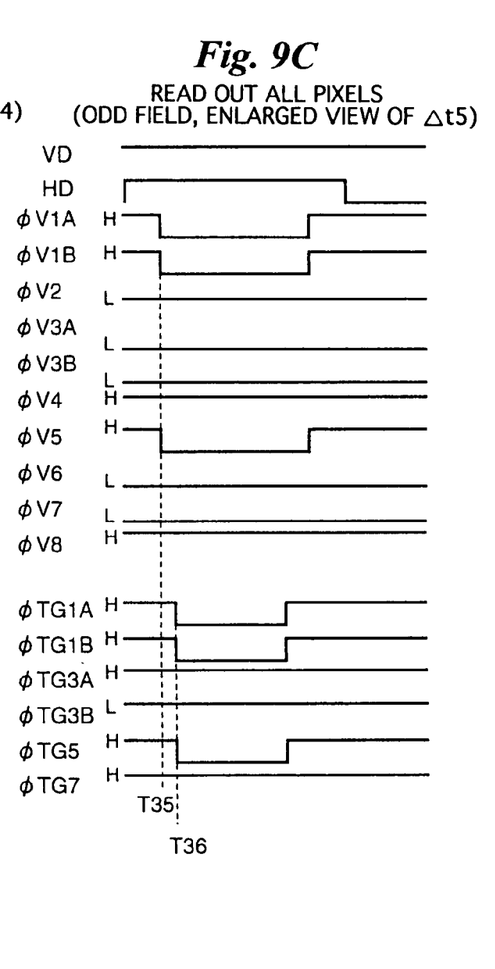

In FIG. 9A, pixels in odd rows (an odd field) are read out in a time period Δt4. FIG. 9B is an enlarged view of the time period Δt4. FIG. 9C is an enlarged view of a time period Δt5 shown in FIG. 9B.

At the time T35, the vertical transfer pulses φV1A, φ V1B, and φV5 are respectively applied to the vertical transfer electrodes V1A, V1B, and V5, so that potential wells are respectively formed under the electrodes. At the time T36, transfer gate pulses φTG1A, φTG1B, and φTG5 are respectively applied to the transfer gates 23, so that signal charges respectively accumulated in the photodiodes 21 in the (8m+1)-th row, the (8m+3)-th row, the (8m+5)-th row, and the (8m+7)-th row are shifted to the vertical transfer paths 22. The shifted signal charges are transferred in the vertical transfer path 22, and are fed to the horizontal transfer path 25. The signal charges are outputted from the horizontal transfer path 25, thereby obtaining a video signal in an odd field.

Figure 10A:
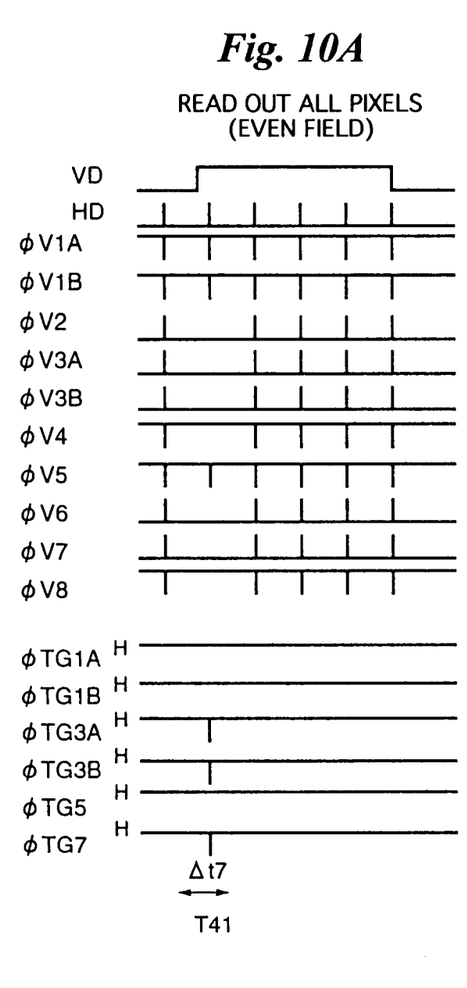
FIGS. 10A and 10B are timing charts showing readout of all pixels in a CCD in a G-stripe R/B checkered arrangement.
Figure 10B:
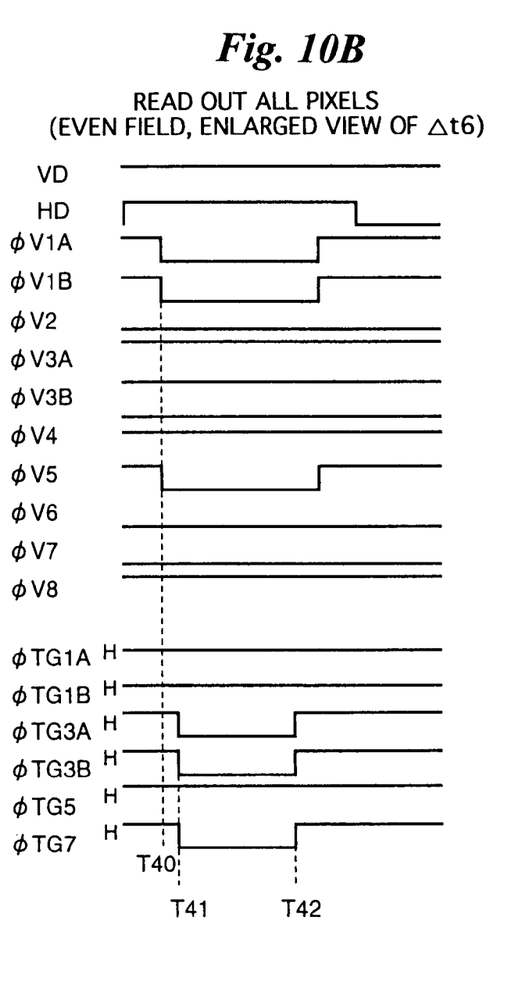

In FIG. 9A, pixels in even rows (an even field) are read out in a time period Δt6. FIG. 10A is an enlarged view of the time period Δt6. FIG. 10B is an enlarged view of a time period Δt7 shown in FIG. 10A.

At the time T40, the vertical transfer pulses φV1A, φ V1B, and φV5 are respectively applied to vertical transfer electrodes V1A, V1B, and V5, so that potential wells are respectively formed under the electrodes. At the time T41, transfer gate pulses φTG3A, φTG3B, and φTG5 are respectively applied to the transfer gates 23, so that signal charges respectively accumulated in the photodiodes 21 in the (8m+2)-th row, the (8m+4)-th row, the (8m+6)-th row, and the (8m+8)-th row are shifted to the vertical transfer paths 22. The shifted signal charges are transferred in the vertical transfer paths 22, and are fed to the horizontal transfer path 25. The signal charges are outputted from the horizontal transfer path 25, thereby obtaining a video signal in an even field.

When such ¼ pixel thinning that pixels are periodically thinned every four pixels in the vertical direction is performed in the interline transfer type CCD as shown in FIG. 8, the order of color components respectively represented by signal charges corresponding to one row which are inputted to the horizontal transfer path 25 is a repetition of G, R, B and G. When complementary colors are generated, as described above, they are the same in the same column.

Figure 11:
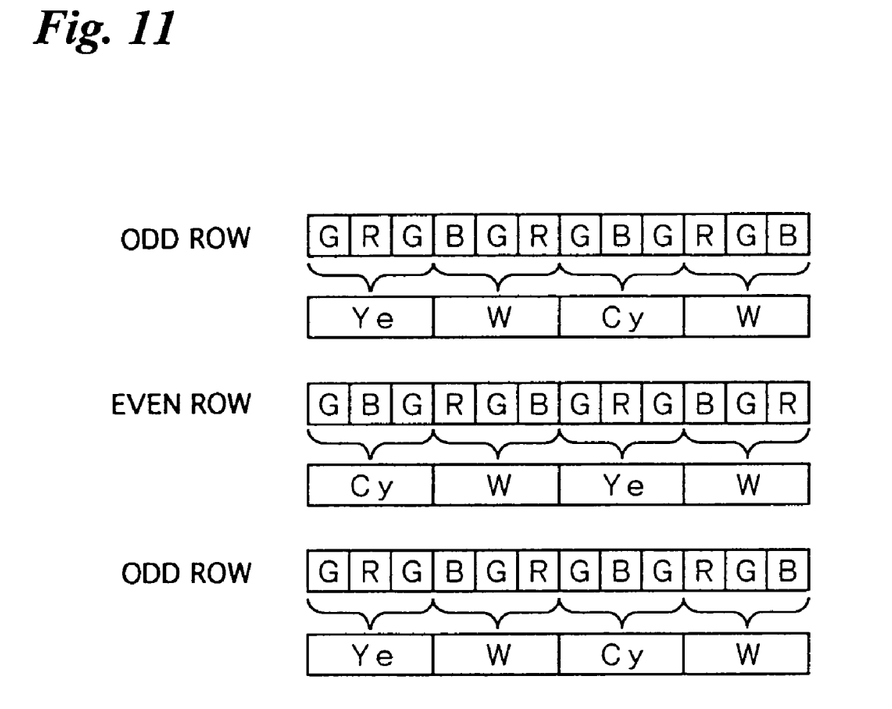
FIG. 11 illustrates color components respectively represented by signal charges inputted to a horizontal transfer path.
Figure 12:
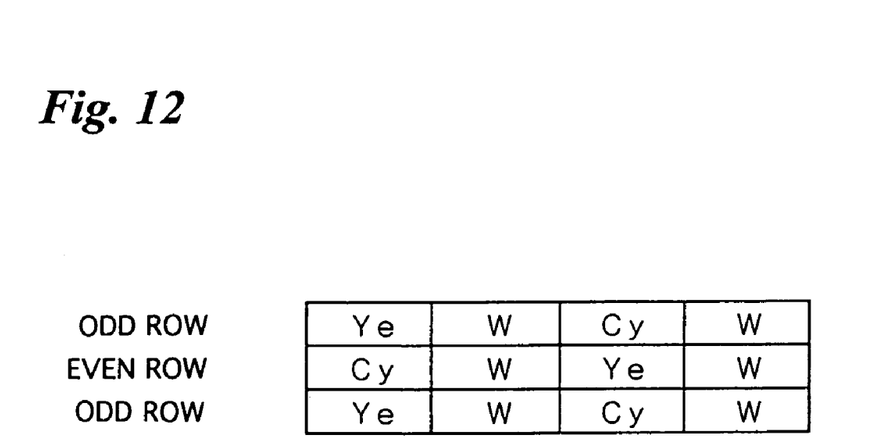
FIG. 12 illustrates complementary color components respectively represented by signal charges mixed in a horizontal transfer path.

In the present embodiment, therefore, ¼ pixel thinning is realized in such a manner that vertical transfer pulses φ TG1B, φTG3B, φTG5A, and φTG7A are respectively applied to the transfer gates 11. The order of color components respectively represented by signal charges inputted to the horizontal transfer path 25 is a repetition of G, R, G and B in odd rows, while being a repetition of G, B, G and R in even rows as shown in FIG. 11. When the signal charges corresponding to three pixels are mixed, yellow and cyan even in the same column appear in different orders in odd rows and even rows, as shown in FIG. 12. The signal charges can be reproduced to the RGB color signal using two pixels adjacent along columns corresponding to two rows, thereby making it possible to prevent a false signal from being generated.

Figure 13A:
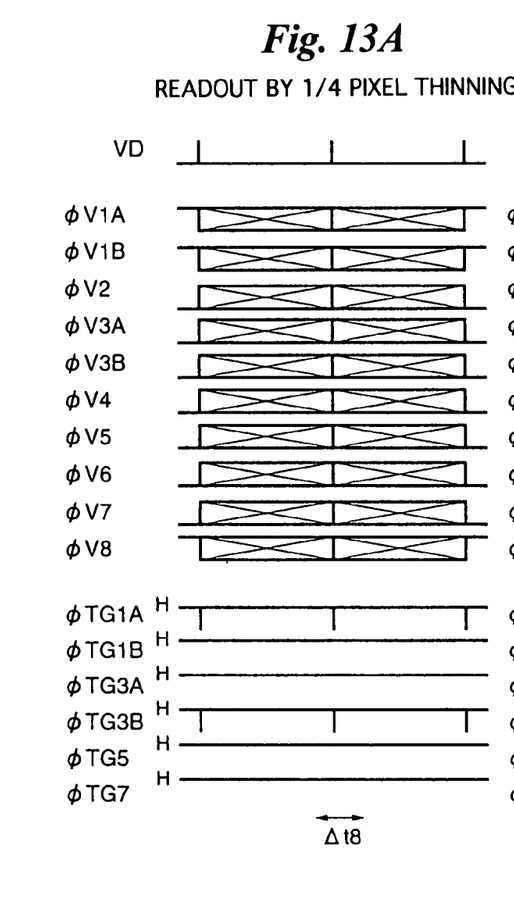
FIGS. 13A, 13B, and 13C are timing charts showing readout by ¼ pixel thinning in a CCD in a G-stripe R/B checkered arrangement.
Figure 13B:
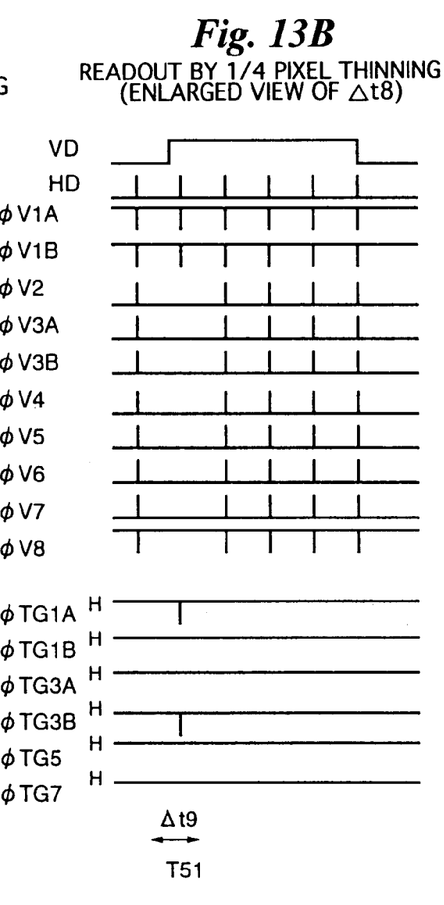
Figure 13C:
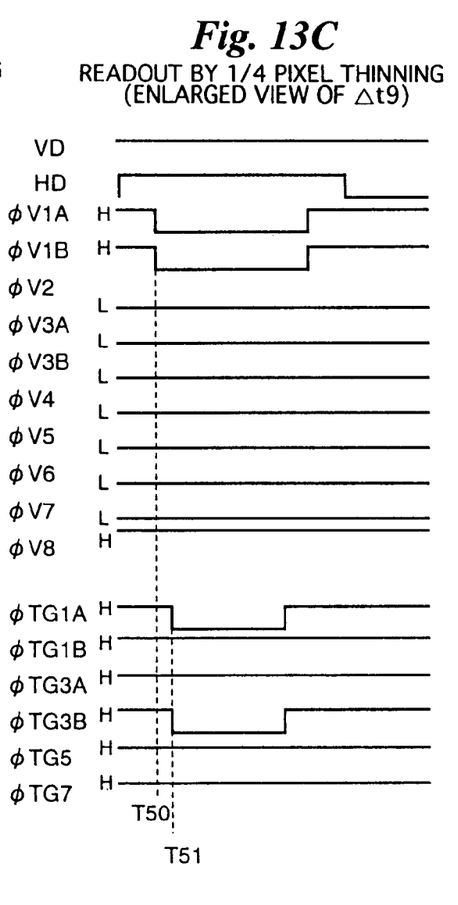

FIGS. 13A, 13B, and 13C are timing charts in a case where ¼ pixel thinning is performed. FIG. 13B is an enlarged view of a time period Δt8 shown in FIG. 13A, and FIG. 13C is an enlarged view of a time period Δt9 shown in FIG. 13B.

When ¼ pixel thinning is performed, the vertical transfer pulses φV1A and φV1B are respectively applied to the vertical transfer electrodes V1A and V1B at the time T50. Consequently, potential wells are respectively formed under the vertical transfer electrodes V1A and V1B. At the time T51, transfer gate pulses φTG1B and φTG3B are respectively applied to the transfer gates 23. Consequently, signal charges respectively accumulated in the photodiodes 21 in the (8m+1)-th row and the (8m+6)-th row are shifted to the vertical transfer paths 22. Signal charges respectively accumulated in the photodiodes 21 in the (8m+2)-th row, the (8m+3)-th row, the (8m+4)-th row, the (8m+5)-th row, the (8m+7)-th row, and the (8m+8)-th row are not shifted to the vertical transfer paths 22, so that ¼ pixel thinning is accomplished.

The signal charges shifted to the vertical transfer paths 22 are transferred to the horizontal transfer path 25 along the vertical transfer paths 22, as described above. Further, the pixels are mixed, as described above, in the horizontal transfer path 25.

Figure 14:
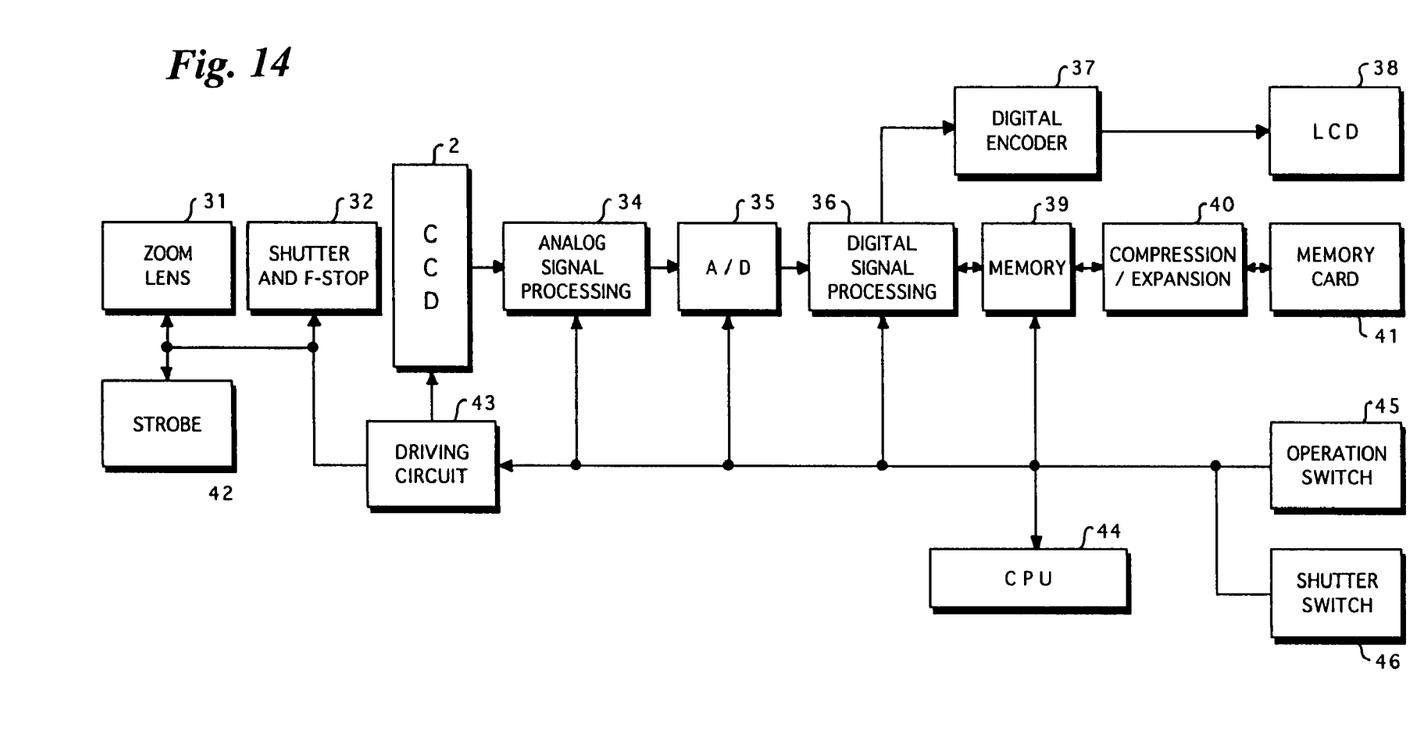
FIG. 14 is a block diagram showing the electrical configuration of a digital still camera.

FIG. 14 is a block diagram showing the electrical configuration of a digital still camera comprising the above-mentioned CCD 2.

The overall operation of the digital still camera is supervised by a CPU 44.

The digital still camera comprises a driving circuit 43. The above-mentioned vertical transfer pulses, horizontal transfer pulses, and so forth are generated by the driving circuit 43, and are applied to the CCD 2. The other clock pulses are generated, and are applied to each circuit from the driving circuit 43.

The digital still camera comprises an operation switch 45 including a switch for setting a mode, for example. A signal from the operation switch 45 and a signal from a shutter switch 46 are inputted to the CPU 44.

Furthermore, the digital still camera comprises a strobe device 42 such that strobe imaging is possible.

Used as the CCD 2 in the digital still camera is one having the above-mentioned structure.

In an imaging mode, a subject image is formed on a light receiving surface of the CCD 2 through a shutter and an f-stop 32 by a zoom lens 31. In the above-mentioned manner, complementary color signals are generated in the CCD 2. The complementary color signals representing the subject image are inputted to an analog signal processing circuit 34. In the analog signal processing circuit 34, predetermined analog signal processing is performed. In an analog-to-digital conversion circuit 35, the complementary color signals are converted into digital image data.

In the digital image data, a phase shift between the complementary color signals in odd and even rows is adjusted, as described above, in the digital signal processing circuit 36. For example, complementary color data corresponding to two rows are stored in line memories corresponding to two lines, and the complementary color data are subjected to sampling processing, thereby adjusting the phase shift between the complementary color data. The complementary color data between which the phase shift has been adjusted are returned (reproduced) again to RGB color image data.

When RGB image data is generated from complementary color data corresponding to three pixels out of complementary color data corresponding to two rows, that is, complementary color data corresponding to a total of four pixels comprising two pixels and two pixels which are adjacent to each other, generation processing is performed on the basis of the equations 1 to 3, as described above.

When the RGB image data is generated from the complementary color data corresponding to two rows, that is, the complementary color data corresponding to a total of four pixels comprising two pixels and two pixels which are adjacent to each other, generation processing is performed on the basis of the equations 4 to 6, as described above.

The image data outputted from the digital signal processing circuit 36 is fed to a liquid crystal display device 38 through a digital encoder 37, so that the subject image is visibly displayed. A relatively clear image in which a false signal is prevented from being generated is displayed.

When the shutter switch 46 is pressed, the RGB image data outputted from the digital signal processing circuit 36 is temporarily stored in a memory 39. The RGB image data is read out of the memory 39, and is inputted to a compression/expansion circuit 40, where compression processing is performed. The compressed image data is recorded on a memory card 41.

When a reproduction mode is set by the operation switch 45, the compressed image data recorded on the memory card 41 is read out. The read compressed image data is expanded in the compression/expansion circuit 40. The expanded image data is fed to the liquid crystal display device 38 through the memory 39, the digital signal processing circuit 36, and the digital encoder 37. Therefore, an image represented by the image data recorded on the memory card 41 is displayed.

Although the present invention has been described and illustrated in detail, it is clearly understood that the same is by way of illustration and example only and is not to be considered by way of limitation, the spirit and scope of the present invention being limited only by the terms of the appended claims.

What is claimed is:

1. A solid-state electronic imaging device comprising:
a lot of photoelectric conversion elements arranged in the column direction and the row direction;
a plurality of vertical transfer paths for transferring signal charges respectively accumulated in said photoelectric conversion elements in the vertical direction;
one or more transfer gates for respectively shifting the signal charges accumulated in the photoelectric conversion elements to said vertical transfer paths upon receipt of transfer gate pulses;
a horizontal transfer path for horizontally transferring the signal charges transferred from the vertical transfer paths;
color filters respectively formed on the photoelectric conversion elements and arranged such that the order of color signal components respectively represented by the signal charges substantially corresponding to one row which are inputted to the horizontal transfer path in reading out all pixels is a repetition of a red signal component, a green signal component, a blue signal component, and a green signal component, and the respective timings at which the red signal component and the blue signal component are outputted in odd rows are reverse to those in even rows; and
a readout control that applies the transfer gate pulses to said transfer gates such that the order of color signal components respectively represented by the signal charges substantially corresponding to one row which are inputted to the horizontal transfer path is a repetition of a red signal component, a green signal component, a blue signal component, and a green signal component in every other row, and the respective timings at which the red signal component and the blue signal component are outputted in odd rows are reverse to those in even rows; and wherein said horizontal transfer path said horizontal transfer path is provided with a plurality of horizontal transfer electrodes;

said solid-state electronic imaging device further comprising a mix control that applies horizontal transfer pulses to plural horizontal transfer electrodes of said horizontal transfer electrodes and changes the horizontal transfer electrodes to which said horizontal transfer pulses are applied in order to control mixing of the signal charges and an amount of the mixed signal charges.

2. The solid-state electronic imaging device according to claim 1, wherein said photoelectric conversion elements are in a honeycomb arrangement where they are arranged in odd rows or even rows with respect to odd columns and arranged in even rows or odd rows with respect to even columns, and the color filters which allow the transmission of a green light component are respectively arranged in said photoelectric conversion elements in odd rows or even rows, and the color filters which allow the transmission of a blue or red light component are alternately arranged for each column and for each row in said photoelectric conversion elements in even rows or odd rows.

3. The solid-state electronic imaging device according to claim 1, wherein said color filters are in a G-stripe R/B checkered arrangement where the color filter which allow the transmission of a green light component are arranged in a vertical stripe shape, and the color filters which allow the transmission of a blue or red light component are arranged in a checkered shape.

4. The solid-state electronic imaging device of claim 1, wherein every three adjacent signal charges from the row of signal charges inputted to the horizontal transfer path are mixed in the horizontal transfer path.

5. A solid-state electronic imaging device comprising:

a plurality of photoelectric conversion elements arranged in the column direction and the row direction; one or more vertical transfer paths for transferring signal charges respectively accumulated in said photoelectric conversion elements in the vertical direction; one or more transfer gates for respectively shifting the signal charges accumulated in the photoelectric conversion elements to said vertical transfer path upon receipt of transfer gate pulses; and a horizontal transfer path for horizontally transferring the signal charge transferred from the horizontal transfer paths, where a method of controlling the operation of the solid-state electronic imaging device comprises:

forming and arranging color filters respectively on the photoelectric conversion elements such that the order of color signal components respectively represented by the signal charges substantially corresponding to one row which are inputted to the horizontal transfer path in reading out all pixels is a repetition of a red signal component, and a green signal component, and the respective timings at which the red signal component and the blue signal component are outputted in odd rows are reverse to those in even rows, applying the transfer gate pulses to said transfer gates such that the order of color signal components respectively represented by the signal charges substantially corresponding to one row which are inputted to the horizontal transfer path is a repetition of red signal component, a green signal component, a blue signal component, and a green signal component in every other row, and the respective timings at which the red signal component and the blue signal component are outputted in odd rows are reverse to those in even rows, wherein said horizontal transfer path is provided with a plurality of horizontal transfer electrodes; and applying horizontal transfer pulses to plural horizontal transfer electrodes of said horizontal transfer electrodes and changing the horizontal transfer electrodes to which said horizontal transfer pulses are applied in order to control mixing of the signal charges and an amount of the mixed signal charges.

6. The solid-state electronic imaging device of claim 5, wherein every three adjacent signal charges from the row of signal charges inputted to the horizontal transfer path are mixed in the horizontal transfer path.

7. A method of controlling signals from a photoelectric conversion element array, comprising:

arranging a plurality of photoelectric conversion elements, each photoelectric conversion element producing a color signal, in adjacent offset rows and columns, such that each adjacent row and column is comprised of either photoelectric conversion elements producing only a green color signal or photoelectric conversion elements that produce in an alternating sequence, a red color signal and a blue color signal;

controlling a readout of the color signals from the photoelectric conversion elements using transfer gate pulses associated with transfer gates for shifting the color signals to a vertical transfer path adjacent to each column and the transfer of the color signals from the vertical transfer path to a horizontal transfer path;

mixing the green color signals, red color signals and blue color signals from adjacent rows so that the order of the color signals in the horizontal transfer path is a repetition of a red color signal, green color signal, blue color signal and green color signal in every other row, and the respective timings at which the red signal component and blue signal component are outputted in odd rows are reverse to those in even rows, wherein said horizontal transfer path is provided with a plurality of horizontal transfer electrodes; and applying horizontal transfer pulses to plural horizontal transfer electrodes of said horizontal transfer electrodes and changing the horizontal transfer electrodes to which said horizontal transfer pulses are applied in order to control the mixing of the signal charges and an amount of the mixed signal charges.

8. The method of claim 7, wherein every three adjacent signal charges from the row of signal charges inputted to the horizontal transfer path are mixed in the horizontal transfer path.

* * * * *